US009850374B2

(12) United States Patent
Platel et al.

(10) Patent No.: US 9,850,374 B2
(45) Date of Patent: Dec. 26, 2017

(54) USE AS AN AGENT IMPROVING THE WORKABILITY OF AN AQUEOUS FORMULATION WITH A HYDRAULIC BINDER BASE, OF A (METH)ACRYLIC COMB-BRANCHED COPOLYMER AND AN ASSOCIATIVE ACRYLIC THICKENER

(71) Applicant: COATEX, Genay (FR)

(72) Inventors: David Platel, Saint Maurice de Gourdans (FR); Jean Moro, Saint-Didier de Formans (FR); Olivier Guerret, La Tour de Salvagny (FR)

(73) Assignee: COATEX, Genay (FR)

( * ) Notice: Subject to any disclaimer, the term of this patent is extended or adjusted under 35 U.S.C. 154(b) by 38 days.

(21) Appl. No.: 14/510,186

(22) Filed: Oct. 9, 2014

(65) Prior Publication Data

US 2015/0051319 A1    Feb. 19, 2015

Related U.S. Application Data

(63) Continuation of application No. 13/126,021, filed as application No. PCT/IB2009/007589 on Nov. 25, 2009.

(30) Foreign Application Priority Data

Dec. 8, 2008 (FR) ...................... 08 58346

(51) Int. Cl.
| | | |
|---|---|---|
| C08L 33/14 | (2006.01) | |
| C04B 16/04 | (2006.01) | |
| C04B 40/00 | (2006.01) | |
| C04B 103/32 | (2006.01) | |

(52) U.S. Cl.
CPC .............. *C08L 33/14* (2013.01); *C04B 16/04* (2013.01); *C04B 40/0039* (2013.01); *C04B 2103/32* (2013.01); *C08L 2205/02* (2013.01)

(58) Field of Classification Search
CPC ..................................................... C04B 16/04
See application file for complete search history.

(56) References Cited

U.S. PATENT DOCUMENTS

| | | | |
|---|---|---|---|
| 3,989,454 | A | 11/1976 | Arthur et al. |
| 4,025,703 | A | 5/1977 | Pornin et al. |
| 6,165,262 | A | 12/2000 | Kono et al. |
| 2006/0111479 | A1 | 5/2006 | Hidalgo et al. |
| 2008/0190615 | A1 | 8/2008 | Drochon |
| 2008/0295741 | A1 | 12/2008 | Jeknavorian et al. |

FOREIGN PATENT DOCUMENTS

| | | |
|---|---|---|
| GB | 2 445 285 | 7/2008 |
| JP | 60-161365 | 8/1985 |
| JP | 2005-281022 | 10/2005 |
| JP | 2008169055 A * | 7/2008 |
| WO | 2007-047407 | 4/2007 |

OTHER PUBLICATIONS

Machine translation of JP 2008169055 A, 2008.*
Sakai, E. et al. "Molecular Structure and Dispersion-Adsorption Mechanisms of Comb-Type Superplasticizers Used in Japan." Journal of Advanced Concrete Technology, vol. 1, No. 1. pp. 16-25. XP-002536299 (Apr. 2003).
International Search Report dated Mar. 11, 2010, in corresponding PCT/IB09/07589 filed Nov. 25, 2009.
Japanese Notice of Rejection dated Aug. 27, 2013, in Japan Patent Application No. 2011-539114 (English translation only).

* cited by examiner

*Primary Examiner* — Wenwen Cai
(74) *Attorney, Agent, or Firm* — Oblon, McClelland, Maier & Neustadt, L.L.P.

(57) ABSTRACT

The present invention pertains to the use, in the manufacture of an aqueous formulation with a hydraulic binder base, of a combination of at least one comb-branched copolymer having a (meth)acrylic skeleton, onto which are grafted side-chains terminated by a hydrophilic group, and at least one ASE acrylic polymer. This results in improving the workability of said formulation, without causing a segregation phenomenon.

9 Claims, 2 Drawing Sheets

USE AS AN AGENT IMPROVING THE WORKABILITY OF AN AQUEOUS FORMULATION WITH A HYDRAULIC BINDER BASE, OF A (METH)ACRYLIC COMB-BRANCHED COPOLYMER AND AN ASSOCIATIVE ACRYLIC THICKENER

REFERENCE TO PRIOR APPLICATIONS

This application is a Continuation of U.S. application Ser. No. 13/126,021, filed Apr. 26, 2011, now pending; which is a 371 of PCT/IB09/07589, filed Nov. 25, 2009. Priority to French patent application 0858346, filed Dec. 8, 2008, is claimed, and all are incorporated herein by reference.

The present invention pertains to the field of admixtures which are used in aqueous formulations with hydraulic binder bases, such as cements, concretes, or mortars, in order to improve their workability. The highest-performance among these workability agents today are comb-branched polymers, which have a skeleton of a (meth)acrylic nature onto which are grafted monomers with hydrophilic functions, of the alcoxy- or hydroxy-polyakylene glycol type. These polymers are hereafter designated as "hydrophilic (meth)acrylic comb-branched polymers".

However, until now their potential could not be optimally exploited: the desire to overdose these admixtures has caused the formulation's mechanical properties to drop, and segregation, i.e. a physical separation between the various components of the mixture, has sometimes been observed.

The present invention, which relies on combining these methacrylic comb-branched polymers having a grafted monomer with a hydrophilic function, with an ASE (alkali-soluble emulsion) associative acrylic thickener, makes it possible to advantageously remedy this drawback. As a result, the workability of an aqueous formulation with a hydraulic binder base is maintained over periods longer than three hours, without any segregation phenomenon nor loss of mechanical properties.

Reducing the quantity of water in formulations containing hydraulic binders, though without altering their fluidity, is essential: this results in doping their mechanical properties. To do so, the person skilled in the art has for several years developed admixtures known as "water-reducing agents", also known by the expressions "fluidifying agents", "plasticizers", and "superplasticizers".

Historically, the first of them were lignosulfonates, as described in the document U.S. Pat. No. 3,772,045, then polycondensates of formaldehyde and naphthalene or melamine sulfonates were later used, as illustrated in the documents U.S. Pat. No. 3,359,225 and U.S. Pat. No. 4,258,790.

Once adsorbed onto the surface of the cement particles, these polymers, which are negatively charged, cause a phenomenon of electrostatic repulsion, which is the impetus for the cement particle dispersion mechanism; they require a dosage of about 0.4% solids content of the polymer in relation to the solids content of the cement, as instructed in the document "Superplasticizers for extending workability" (International Conference on superplasticizers and other chemical admixtures in concrete, Sorrento Italy, Oct. 29-Nov. 1, 2006, supplementary paper, Ed. Malhotra, American Concrete Institute, pp. 263-277)

A new better-performing family of water-reducing agents then appeared: that of carboxylic comb-branched polymers with a skeleton that is generally (meth)acrylic in nature, onto which are grafted hydrophilic side-chains with alcoxy- or hydroxy-polyalkylene glycol functions (see the document cited above).

This improved water-reducing power is explained by the existence of a steric repulsion mechanism relating to the presence of the side-chains, in combination with the electrostatic repulsion phenomenon caused by the anionic carboxylic groups. This improvement leads to the ability to use a lower quantity of the polymer (on the order of 0.2% solids content in relation to the cement's solids content) for a consistency comparable to that obtained with the first-generation products.

However, in dosages like the ones described above, none of these products of the prior art make it possible to resolve a critical technical problem for the person skilled in the art: that of workability retention over very long periods, particularly longer than 3 hours. Workability is defined in document U.S. Pat. No. 7,232,875 as the time during which an aqueous formulation with a hydraulic binder base may still be worked. This value is conventionally measured using a slump test: the height is determined at which a sample added to a conical mold slumps when that mold is lifted. The greater the slump, the better the formulation's workability; if this nature is maintained over time, this is called slump retention.

The person skilled in the art seeks to improve the lasting nature of this workability. Indeed, it is common to manufacture a cement or concrete in a factory, in order to transport it later to the worksite where it is to be used; during this trip, which may take several hours, the formulation's workability must not be altered; otherwise, it can no longer be worked. Alternatively, a new addition of water-reducing agent must be available at the implementation site (this operation is impossible if the formulation has begun to set), or a series of injections must be available during transport: The logistics and additional cost that result are major drawbacks to using such solutions.

In order to maintain the workability of these formulations, the person skilled in the art has instinctively sought to "overdose" the quantity of water-reducing agents used, and particularly hydrophilic comb-branched (meth)acrylic polymer water-reducing agents. This overdosing is meant to extend the acting time of that agent. However, as is now well-known in this field of activity, this overdosing leads to an initial fluidification which is too high.

Consequently, the fluidifying effect acts against the dispersion mechanism: the distribution of the components is no longer even throughout the formulation, which negatively impacts its mechanical properties. In some cases, the initial fluidifying power is so noteworthy that it leads to segregation, i.e. a physical separation of the medium's various components. This issue is recounted in the document WO 2007/047407.

Given the impossibility of overdosing the water-reducing agents of the prior art, and particularly hydrophilic comb-branched (meth)acrylic polymers, the person skilled in the art has engineered alternative solutions, so as to obtain a satisfactory initial fluidifying power and stable workability over time, without the undesirable effects of segregation or loss of mechanical properties.

Thus, the document WO 2007/047407 suggests the obvious solution of adding a setting retarder agent, which raises problems of its own: the agent in and of itself constitutes a new admixture to add to the formulation, its dosage must be optimized based on the quantity of water-reducing agent used, and the resulting workability is no longer stable past two hours.

Other solutions consist of changes dealing with the composition of the hydrophilic comb-branched (meth)acrylic polymers of the prior art; however, they have the drawback of being focused on highly selective chemical structures, and none of them lead to workability lasting longer than three hours. Furthermore, they are all based on structural changes, intended to extend the fluidifying effect of the polymer that is used over time. To that end, the document "Superplasticizers for extending workability" mentioned above, discloses the grafting of side-chains of varying lengths onto the main (meth)acrylic skeleton: they gradually hydrolyze depending on their length, which maintains the dispersing effect over time (up to two and a half hours according to FIG. 4).

At the same time, the document "Development of new superplasticizer providing ultimate workability" (8$^{th}$ CAN-MET, Superplasticizers and other chemical admixtures in concrete, 2008, Ed. Malhotra, American Concrete Institute, pp. 31-49) suggests increasing the number of hydrophilic branches of a comb-branched (meth)acrylic polymer by adding a difunctional carboxylic comonomer onto the main skeleton: this results in a better adsorption of the polymer onto the surface of the cement particles, and therefore stable workability for at least one and a half hour according to table 5.

Finally, the document "development of slump-loss controlling agent with minimal setting retardation" (7$^{th}$ CAN-MET, Superplasticizers and other chemical admixtures in concrete, 2003, Ed. Malhotra, American Concrete Institute, pp. 127-141) describes a comb-branched polymer whose hydrophilic side monomers have ester functions which hydrolyze more slowly: this results in good workability for two and a half hours.

Continuing her research into providing an additive that would make it possible to maintain a good level of initial fluidity in aqueous formulations with a hydraulic binder base, while maintaining their workability without altering their mechanical properties or causing segregation phenomena to occur, the Applicant has developed the use of new admixtures resulting from the mixing of a hydrophilic comb-branched (meth)acrylic copolymer in accordance with the prior art and ASE associative acrylic thickeners.

Figure 1:
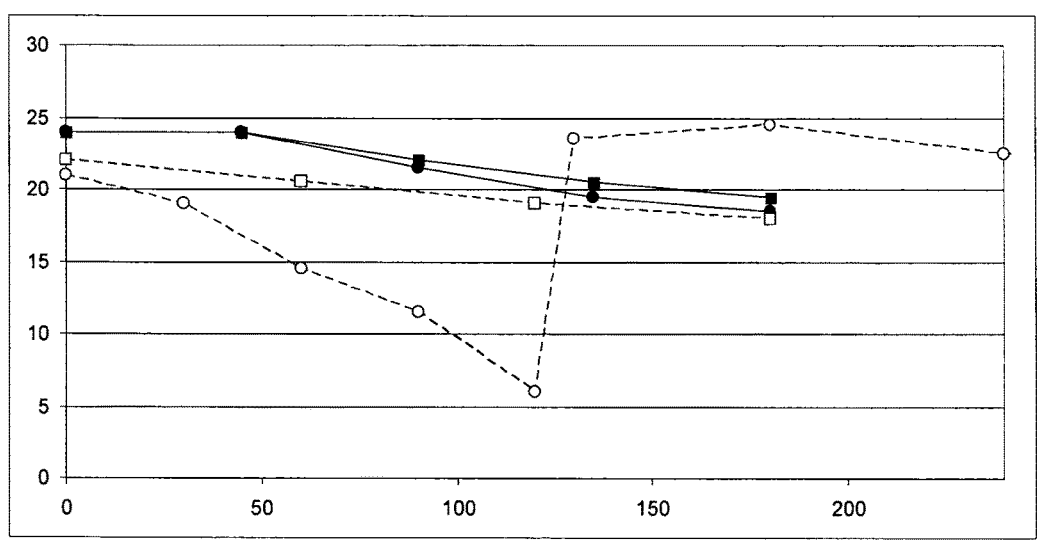
FIG. 1 shows the slump values for Example 1 in centimeters of slump over time in minutes.

ASE (alkali soluble emulsion) thickeners designate thickeners in an emulsion which are copolymers of (meth)acrylic acid with an ester of these acids. The Applicant indicates that such thickeners are different from HASE (hydrophobically modified alkali-soluble emulsions) polymers, which designate thickeners in an emulsion which are copolymers of (meth)acrylic acid, an ester of these acids, and a hydrophobic monomer.

These chemicals' mechanisms of action differ. ASE polymers, in the form of dispersions when in an acidic state, only become soluble once neutralized. By neutralizing the medium, an ionic repulsion mechanisms is caused between the various carboxylate groups carried by the polymer chain. These ionized groups polarize a large quantity of water molecules, which causes the medium's viscosity to increase. In addition to the aforementioned ionic and polarizing phenomenon, HASE polymers involve interactions between the hydrophobic groups, which also contributes to thickening the medium. Entirely unexpectedly, when these hydrophobic (meth)acrylic comb-branched copolymers are used in an aqueous formulation with a hydraulic binder base in the presence of a hydrophilic (meth)acrylic comb-branched copolymer, the result is a very large increase in the dose of the hydrophilic comb-branched copolymer in relation to the prior art, without segregating or altering the mechanical properties: quantities greater than 0.6% solids content of hydrophilic comb-branched polymer in relation to the weight of the cement are achieved.

Doing so causes the formulation's workable time to be increased in a manner unlike any to date: values greater than three hours are achieved, as measured using a conventional slump test.

Therefore, a first object of the invention consists of the use, as an agent improving the workability of an aqueous formula with a hydraulic binder base, of:
 a) at least one comb-branched (meth)acrylic copolymer having at least one side-chain bearing at least one alcoxy- or hydroxy-polyalkylene glycol hydrophilic group,
 b) at least one ASE acrylic polymer.

In a first variant, this use as an agent improving the workability of an aqueous formula with a hydraulic binder base is further characterized in that said comb-branched copolymer a) and said acrylic polymer b) are added to said aqueous formulation separately.

In a second variant, this use as an agent improving the workability of an aqueous formulation with a hydraulic binder base is further characterized in that said comb-branched copolymer a) and said acrylic polymer b) are added in the form of a mixture. According to this variant, the mixture has a solids content between 10% and 50% of its total weight.

According to this variant, the mixture has a dry solids content of comb-branched copolymer a) of between 5% and 95%, and more preferably between 10% and 90% of its total solid matter.

This use is further characterized in that said comb-branched copolymer a) is made up of, expressed as a percentage by weight of each of its monomers, the sum of these percentages being equal to 100%:
 a1) 5% to 30% of (meth)acrylic acid,
 a2) 70% to 95% of at least one monomer having the formula (I):

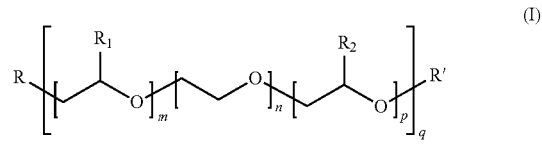

where:
 m, n, p and q are whole numbers and m, n, p are less than 150, q is greater than 0, and at least one whole numbers among m, n and p is nonzero;
 R is a radical containing a polymerizable unsaturated function, more preferably belonging to the group of vinylics as well as the group of acrylic, methacrylic, and maleic esters, and to the group of unsaturated urethanes such as acrylurethane, methacrylurethane, α-α' dimethyl-isopropenyl-benzylurethane, allylurethane, as well as to the group of allylic or vinylic ethers, whether substituted or not, or to the group of ethylenically unsaturated amides or imides, $R_1$ and $R_2$ are identical or different, and represent hydrogen atoms or alkyl groups, R' represents hydrogen or a hydrocarbonated radical having 1 to 40 carbon atoms, or an ionic or ionizable group such as a phosphate, a phosphonate, a sulfate, a sulfonate, a carboxylic, or also a primary, secondary or tertiary amine, or a quaternary ammonium, or mixtures thereof, a3) 0% to 50% of at least one monomer different from monomers a1) and a2), and which is more preferably an ester, an amide, an ether, a styrenic monomer, a cationic monomer, a sulfonated monomer, a phosphated monomer, and which is very preferably ethyl acrylate.

This use is also characterized in that said ASE acrylic polymers b) are made up of (meth)acrylic acid and an ester of these acids.

This use is further characterized in that comb-branched copolymer a) and acrylic polymer b) may be obtained by radical polymerization in a solution, direct emulsion, or inverse emulsion, in a suspension or precipitation in solvents, in the presence of catalytic systems and transfer agents, or by radical mediated polymerization and more preferably by nitroxide mediated polymerization (NMP) or cobaloxyme mediated polymerization, by atom transfer radical polymerization (ATRP), or by radical mediated polymerization by sulfur derivatives, chosen from among carbamates, dithioesters or trithiocarbonates (RAFT) or xanthates.

This use is further characterized in that comb-branched copolymer a) and acrylic polymer b) are distilled, after polymerization.

This use is further characterized in that comb-branched copolymer a) and acrylic polymer b) are separated into several phases, using static or dynamic separation processes, by one or more polar solvents more preferably belonging to the group formed by water, methanol, ethanol, propanol, isopropanol, butanols, acetone, tetrahydrofurane, and mixtures thereof.

This use is further characterized in that comb-branched copolymer a) and acrylic polymer b) are fully or partially neutralized by one or more neutralization agents having a monovalent or polyvalent cation, said agents more preferably being chosen from among ammonium hydroxide or from among calcium or magnesium hydroxides and/or oxides, or from among sodium, potassium, or lithium hydroxides, or from among primary, secondary, and tertiary aliphatic and/or cyclic amines and more preferably stearylamine, ethanolamines (mono-, di-, triethanolamine), mono- and diethylamine, cyclohexylamine, methylcyclohexylamine, amino-methyl-propanol, morpholine, and more preferably in that the neutralization agent is chosen from among triethanolamine and sodium hydroxide.

This use as an agent improving the workability of an aqueous formulation with a hydraulic binder base is further characterized in that said formulation is a cement, a mortar, a concrete, or a grout, and more preferably a concrete.

This use as an agent improving the workability of an aqueous formulation with a hydraulic binder base of:

a) at least one comb-branched (meth)acrylic copolymer having at least one side-chain bearing at least one alcoxy- or hydroxy-polyalkylene glycol hydrophilic group, b) at least one ASE acrylic polymer.

is further characterized in that said aqueous formulation with a hydraulic binder base contains 0.1% 2%, more preferably 0.2% to 1%, and very preferably 0.4% to 0.8% solids content of components a) and b) in relation to the solid content of hydraulic binder.

Another object of the invention consists of an aqueous formulation with a hydraulic binder base, containing as an agent improving its workability:

a) at least one comb-branched (meth)acrylic copolymer having at least one side-chain bearing at least one alcoxy- or hydroxy-polyalkylene glycol hydrophilic group, b) at least one ASE acrylic polymer.

This formulation is further characterized in that said comb-branched copolymer a) is made up of, expressed as a percentage by weight of each of its monomers, the sum of these percentages being equal to 100%:

a1) 5% to 30% of (meth)acrylic acid, a2) 70% to 95% of at least one monomer having the formula (I):

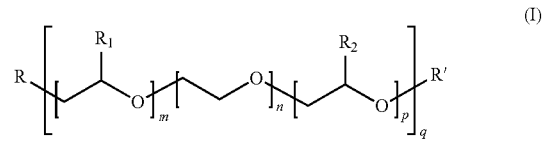

where:

m, n, p and q are whole numbers and m, n, p are less than 150, q is greater than 0, and at least one whole numbers among m, n and p is nonzero;

R is a radical containing a polymerizable unsaturated function, more preferably belonging to the group of vinylics as well as the group of acrylic, methacrylic, and maleic esters, and to the group of unsaturated urethanes such as acrylurethane, methacrylurethane, α-α' dimethyl-isopropenyl-benzylurethane, allylurethane, as well as to the group of allylic or vinylic ethers, whether substituted or not, or to the group of ethylenically unsaturated amides or imides, $R_1$ and $R_2$ are identical or different, and represent hydrogen atoms or alkyl groups, R' represents hydrogen or a hydrocarbonated radical having 1 to 40 carbon atoms, or an ionic or ionizable group such as a phosphate, a phosphonate, a sulfate, a sulfonate, a carboxylic, or also a primary, secondary or tertiary amine, or a quaternary ammonium, or mixtures thereof, a3) 0% to 50% of at least one monomer different from monomers a1) and a2), and which is more preferably an ester, an amide, an ether, a styrenic monomer, a cationic monomer, a sulfonated monomer, a phosphated monomer, and which is very preferably ethyl acrylate.

This formulation is further characterized in that said ASE acrylic polymers b) are made up of (meth)acrylic acid and an ester of these acids, and (meth)acrylic acid and an ester of these acids.

This formulation is further characterized in that comb-branched copolymer a) and acrylic polymer b) may be obtained by radical polymerization in a solution, direct emulsion, or inverse emulsion, in a suspension or precipitation in solvents, in the presence of catalytic systems and transfer agents, or by radical mediated polymerization and more preferably by nitroxide mediated polymerization (NMP) or by cobaloxyme mediated polymerization, by atom transfer radical polymerization (ATRP), by radical mediated polymerization by sulfur derivatives, chosen from among carbamates, dithioesters or trithiocarbonates (RAFT) or xanthates.

This formulation is further characterized in that comb-branched copolymer a) and acrylic polymer b) are distilled, after polymerization.

This formulation is further characterized in that comb-branched copolymer a) and acrylic polymer b) are separated into several phases, using static or dynamic separation processes, by one or more polar solvents more preferably belonging to the group formed by water, methanol, ethanol, propanol, isopropanol, butanols, acetone, tetrahydrofurane, and mixtures thereof.

This formulation is further characterized in that comb-branched copolymer a) and acrylic copolymer b) are fully or partially neutralized by one or more neutralization agents having a monovalent or polyvalent cation, said agents being more preferably chosen from among ammonium hydroxide or from among calcium or magnesium hydroxides and/or oxides, or from among sodium, potassium, or lithium hydroxides, or from among primary, secondary, and tertiary aliphatic and/or cyclic amines and more preferably stearylamine, ethanolamines (mono-, di-, triethanolamine), mono- and diethylamine, cyclohexylamine, methylcyclohexylamine, amino-methyl-propanol, morpholine, and more preferably in that the neutralization agent is chosen from among triethanolamine and sodium hydroxide.

This formulation is further characterized in that it is a cement, a mortar, a concrete, or a grout, and more preferably a concrete.

This formulation is further characterized in that it contains 0.1% to 2%, more preferably 0.2% to 1%, and very preferably 0.4% to 0.8% solids content of components a) and b) in relation to the solid content of hydraulic binder.

EXAMPLES

In all tests, the molecular mass of the polymers used in aqueous solutions a) are determined using a multi-detection steric exclusion chromatography (SEC 3D) technique, as indicated in the document FR 2,917,091.

The masses of the polymers used in aqueous solutions b) are determined using a steric exclusion chromatography technique, as indicated in the document FR 2,907,347.

Example 1

The polymers used are obtained by polymerization techniques which are well-known to the person skilled in the art.

All of the tests begin by adding into a masonry-style electric cement mixer (volume of about 100 liters) 22 kg of 10/20 aggregates and 25 kg of 0/4 sand, which are then mixed for 30 seconds.

Next, 6.5 kg of CEM I 52.4 PM ES cement are added; this corresponds to the starting time.

The dry materials are mixed for 1 minute.

Next, a certain quantity of an aqueous solution containing the product according to the prior art or according to the invention is added.

The mixing of the blend is then continued for 7 minutes.

The slump is then measured with an Abraham cone using the method described in the AFNOR EN 12350-2 standard. This first measurement corresponds to the initial slump value, whose change is tracked over time.

The slump of values has been depicted in FIG. 1, in centimeters of slump over time in minutes.

The dotted curve with round symbols relates to Test 1 in accordance with the prior art, in which it is necessary to add product to compensate for the loss of workability (relative to the slump measurement).

The dotted curve with square symbols relates to Test 2 according to the prior art, in which the product is overdosed.

The solid curve with round symbols relates to Test 3 according to the invention, which uses two products added separately.

The solid curve with square symbols relates to Test 4 according to the invention, which uses two products added as a mixture.

Test No. 1

This test illustrates the prior art and uses 0.065 kg of an aqueous solution (40% by weight) of a hydrophilic comb-branched copolymer, whose molecular mass by weight is equal to 40,000 g/mol, made up of (by weight):
  a1) 10% methacrylic acid,
  a2) 90% of a monomer with formula (I) wherein:
    $m+n+p=56, q=1$
  R is the methacrylate function,
  $R_1$ and $R_2$ designate the methyl group,
  R' designates hydrogen In this test, the product is (hydrophilic comb-branched polymer) used is therefore 0.40% solids content of the copolymer in relation to the cement's solids content, which corresponds to the dose normally used by the person skilled in the art.

Tracking the change in slump over time (see the dashed curve with round symbols in FIG. 1), a reduction in slump is observed, meaning a very noteworthy loss of workability.

At the end of 2 hours, it was sought to remedy this decrease by adding 0.035 kg of the same aqueous solution containing the same copolymer: its dose then became equal to 0.62% solids content of copolymer in relation to the cement's solids content.

Workability is then observed to rise again. However, it was necessary to add the product: this represents both logistics which are complicated to develop at an industrial scale, and an intermediate (and therefore undesirable) change to the composition of the concrete.

Test No. 2

This test illustrates the prior art and uses 0.1 kg of the same aqueous solution as the one used during Test 1.

In this situation, all of said solution is added at the beginning of the test. The dose of the product (a hydrophilic comb-branched polymer) that is used is equal to 0.62% by solids content in relation to the solids content of the cement: this illustrates an "overdosage" test as sometimes practiced in the prior art.

First, it is noted that workability is less than that obtained with the inventive products (see FIG. 1).

Figure 2:
FIG. 2 is a photo representing the composition of Example 1 at the initial moment, once the Abraham cone has been removed.

Second, as shown in FIG. 2, which is a photo representing the composition at the initial moment, once the Abraham cone has been removed, a very noteworthy segregation phenomenon appears, which is undesirable for the person skilled in the art.

Test No. 3

This test illustrates the invention and uses 0.120 kg in total, including:
a) 90% by weight of the same aqueous solution as the one used in test 1,
b) 10% by weight of an aqueous solution of an ASE acrylic polymer (35% by weight), whose molecular mass by weight is equal to 40,000 g/mol and is made up, by weight, of:
  b1) 55% methacrylic acid,
  b2) 45% ethyl acrylate.
these two solutions a) and b) being added initially, but separately.

In this test, 0.66% by solids content of hydrophilic comb-branched copolymer a) in relation to the cement's solids content is therefore used.

Test No. 4

This test illustrates the invention and uses 0.120 kg of an aqueous solution, containing:
a) 90% by weight of aqueous solution a) used in test 1,
b) 10% by weight of aqueous solution b) used in test 3.

The aqueous solution is initially added in the form of the mixture between solutions a) and b).

In this test, 0.66% by solids content of hydrophilic comb-branched copolymer a) in relation to the cement's solids content is therefore used.

Tests 3 and 4 do not lead to any segregation phenomenon: however, they make it possible to overdose the quantity of hydrophilic comb-branched copolymer a) that is used.

Additionally, and entirely advantageously, the result is a workability that is at all points greater than that obtained for the prior art, without adding product later on.

Finally, this workability is entirely stable for 3 hours, which was never possible before.

Example 2

In all the following tests, a concrete is produced in the same way as in example 1.

The slump is then measured with an Abraham cone using the method described in the AFNOR EN 12350-2 standard. This first measurement corresponds to the initial slump value $A_0$ (cm). The same measurement is taken after 180 minutes $A_{180}$ (cm).

At the start, the concrete is checked to verify there is no segregation, and then the change in the slump value is checked after 180 minutes.

The following tests use a mixture of 2 aqueous solutions a) and b), the mixture being initially introduced as in example 1.

Test No. 5

This test illustrates the invention and uses 0.360 kg of an aqueous solution, containing:
a) 90% by weight of an aqueous solution (40% by weight) of a hydrophilic comb-branched copolymer, whose molecular mass is equal to 45,000 g/mol and is made up of (by weight):
  a1) 10% methacrylic acid,
  a2) 90% of a monomer with formula (I) wherein:

$$m+n+p=56, q=1$$

R is the methacrylate function,
  $R_1$ and $R_2$ designate the methyl group,
  R' designates hydrogen,
b) 10% by weight of aqueous solution b) used in test 3,
or alternatively 2.0% by weight of hydrophilic comb-branched copolymer a) in relation to the solids content of cement.

Test No. 6

This test illustrates the invention and uses 0.360 kg of an aqueous solution, containing:
a) 90% by weight of an aqueous solution (40% by weight) of a hydrophilic comb-branched copolymer, whose molecular mass is equal to 130,000 g/mol and is made up of (by weight):
  a1) 10% methacrylic acid,
  a2) 90% of a monomer with formula (I) wherein:

$$m+n+p=56, q=1$$

R is the methacrylate function,
  $R_1$ and $R_2$ designate the methyl group,
  R' designates hydrogen,
b) 10% by weight of aqueous solution b) used in test 3,
or alternatively 2.0% by weight of hydrophilic comb-branched copolymer a) in relation to the solids content of cement.

Test No. 7

This test illustrates the invention and uses 0.360 kg of an aqueous solution, containing:
a) 90% by weight of an aqueous solution (40% by weight) of a hydrophilic comb-branched copolymer, whose molecular mass is equal to 74,000 g/mol and is made up of (by weight):
  a1) 10% methacrylic acid,
  a2) 90% of a monomer with formula (I) wherein:

$$m+n+p=56, q=1$$

R is the methacrylate function,
  $R_1$ and $R_2$ designate the methyl group,
  R' designates hydrogen,
b) 10% by weight of aqueous solution b) used in test 3,
or alternatively 2.0% by weight of hydrophilic comb-branched copolymer a) in relation to the solids content of cement.

Test No. 8

This test illustrates the invention and uses 0.2025 kg of an aqueous solution, containing:
a) 80% by weight of aqueous solution a) used in test 3,
b) 20% by weight of aqueous solution b) used in test 3,
or alternatively 1.0% by weight of hydrophilic comb-branched copolymer a) in relation to the solids content of cement.

Test No. 9

This test illustrates the invention and uses 0.180 kg of an aqueous solution, containing:
  a) 90% by weight of aqueous solution a) used in test 5,
  b) 10% by weight of an aqueous solution of an ASE acrylic polymer (35% by weight), made up, by weight, of:
    b1) 50% methacrylic acid,
    b2) 50% ethyl acrylate.
or alternatively 1.0% by weight of hydrophilic comb-branched copolymer a) in relation to the solids content of cement.

Test No. 10

This test illustrates the invention and uses 0.240 kg of an aqueous solution, containing:
  a) 90% by weight of aqueous solution a) used in test 5,
  b) 10% by weight of an aqueous solution of an ASE acrylic polymer, made up, by weight, of:
    b1) 50% methacrylic acid,
    b2) 50% ethyl acrylate.
or alternatively 1.0% by weight of hydrophilic comb-branched copolymer a) in relation to the solids content of cement.

None of these new tests led to a segregation phenomenon.

The slump values at the start $A_0$ (cm) and after 3 hours $A_{180}$ (cm) were recorded in table 1, for test 2 which illustrates the prior art and for tests 3 to 10 which illustrate the invention.

TABLE 1

| Test no. | Prior Art (PA) Invention (IN) | $A_0$ (cm) | $A_{180}$ (cm) |
| --- | --- | --- | --- |
| 2 | PA | 22 | 18 |
| 3 | IN | 24 | 19.5 |
| 4 | IN | 24 | 18.5 |
| 5 | IN | 25 | 20 |
| 6 | IN | 25 | 21 |
| 7 | IN | 24 | 20 |
| 8 | IN | 23 | 19 |
| 9 | IN | 25 | 20 |
| 10 | IN | 23 | 20 |

Advantageously compared to the prior art, the invention successfully increases the dose of aqueous solution a).

The result in a substantial improvement in the initial workability with no phenomenon of segregation as in test 2.

This workability remains improved, even after 3 hours, which had never been observed before.

The invention claimed is:

1. A method of forming an aqueous formulation comprising a hydraulic binder base having improved workability, the method comprising mixing a combination with said hydraulic binder base,
   wherein the combination comprises:
   A) an aqueous solution comprising water and a comb-branched (meth)acrylic copolymer that comprises, expressed as a percentage by weight of each of its monomers:
      a1) 5% to 30% of (meth)acrylic acid,
      a2) 70% to 95% of at least one monomer of formula (I):

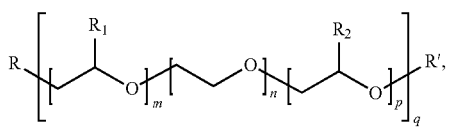

wherein:
   m, n, p, and q are whole numbers and m, n, and p are less than 150, q is greater than 0, and at least one whole numbers among m, n, and p is nonzero;
   R is a radical comprising a polymerizable unsaturated function;
   $R_1$ and $R_2$ are identical or different, and represent a hydrogen atom or an alkyl group,
   R' represents hydrogen, or a hydrocarbonated radical having 1 to 40 carbon atoms, or an ionic or ionizable group; and
      a3) 0% to 50% of at least one monomer different from monomers a1) and a2), wherein a sum of percentages of a1), a2), and a3) equals 100%; and
   B) an aqueous solution comprising water and an ASE acrylic polymer consisting of 55 wt. % methacrylic acid and 45% wt. % ethyl acrylate.

2. The method of claim 1, wherein the aqueous formulation comprising a hydraulic binder base is a mortar.

3. The method of claim 1, wherein the aqueous formulation comprising a hydraulic binder base is a concrete.

4. The method of claim 1, wherein the aqueous formulation comprising a hydraulic binder base is a grout.

5. The method of claim 1, wherein the aqueous formulation comprising a hydraulic binder base, after said mixing, remains workable for at least three hours.

6. The method according to claim 1, wherein said aqueous formulation comprising a hydraulic binder base, after said mixing, has a 0.1 to 2% solids content of said comb-branched (meth)acrylic copolymer and ASE acrylic polymer in relation to a solid content of the hydraulic binder base.

7. The method according to claim 1, wherein the comb-branched (meth)acrylic copolymer is fully or partially neutralized with at least one neutralization agent having a monovalent cation.

8. The method according to claim 1, wherein the ASE acrylic polymer is fully or partially neutralized with at least one neutralization agent having a monovalent cation.

9. The method according to claim 7, wherein the ASE acrylic polymer is fully or partially neutralized with at least one neutralization agent having a monovalent cation.

* * * * *